United States Patent
Jung et al.

(10) Patent No.: US 7,864,793 B2
(45) Date of Patent: Jan. 4, 2011

(54) PACKET TRANSMITTING METHOD AND DEVICE

(75) Inventors: Joon Young Jung, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 159 days.

(21) Appl. No.: 12/189,307

(22) Filed: Aug. 11, 2008

(65) Prior Publication Data

US 2009/0103563 A1     Apr. 23, 2009

(30) Foreign Application Priority Data

Oct. 17, 2007     (KR) .................. 10-2007-0104483

(51) Int. Cl.
*H04J 3/06*     (2006.01)

(52) U.S. Cl. ..................... 370/419; 370/509

(58) Field of Classification Search ............... None
See application file for complete search history.

(56) References Cited

U.S. PATENT DOCUMENTS

| | | | |
|---|---|---|---|
| 6,243,369 B1 * | 6/2001 | Grimwood et al. | 370/335 |
| 7,065,779 B1 | 6/2006 | Crocker et al. | |
| 7,349,386 B1 * | 3/2008 | Gou | 370/356 |
| 2006/0168612 A1 | 7/2006 | Chapman et al. | |
| 2007/0260906 A1 * | 11/2007 | Corredoura | 713/400 |
| 2008/0117938 A1 * | 5/2008 | Erich et al. | 370/503 |

* cited by examiner

*Primary Examiner*—Steven H Nguyen
*Assistant Examiner*—Alex Skripnikov
(74) *Attorney, Agent, or Firm*—Ladas & Parry LLP (57) ABSTRACT

A packet transmission device of a physical layer receives a plurality of packets from a media access control layer that is an upper layer of the physical layer, and detects a packet including a sync message from the packets. The packet transmission device receives first time information for synchronization from the media access control layer, inserts first time information into the sync message, and transmits packets at a predetermined data rate.

9 Claims, 10 Drawing Sheets

PACKET TRANSMITTING METHOD AND DEVICE

CROSS-REFERENCE TO RELATED APPLICATION

This application claims priority to and the benefit of Korean Patent Application No. 10-2007-0104483 filed in the Korean Intellectual Property Office on Oct. 17, 2007, the entire contents of which are incorporated herein by reference.

BACKGROUND OF THE INVENTION (a) Field of the Invention

The present invention relates to a packet transmission method and device for cable network communication. Particularly, the present invention relates to a system packet transmission method and device according to the data-over-cable service interface specifications (DOCSIS) for the cable network communication.

This work was supported by the IT R&D program of MIC/IITA [2006-S-019-02, The Development of Digital Cable Transmission and Receive System for 1 Gbps Downstream].

(b) Description of the Related Art

In a cable modem termination system (CMTS) of a cable head-end, a sync message is transmitted through a media access control (MAC) layer and a physical media dependent (PMD) layer.

The sync message is generated by the MAC layer and is then transmitted through the PMD layer. In this instance, timing synchronization between the two layers must be accurate. However, in general, it is impossible to share system clock signals since the system clock rates used by the two layers do not correspond with each other. In detail, even when the MAC layer uses the local clock signals thereof to transmit data to the PMD layer with an accurate output rate, the local clock signals do not match the local clock signals of the PMD layer, and no accurate synchronization is maintained. The final output of the MAC layer has the transmission rate of 26.97032 Mbps (megabits-per-second) or 38.81070 Mbps with the 188-byte MPEG-2 (Moving Picture Experts Group-2) transport stream packets. The PMD layer outputs RF signals of 5.056941 Msps (mega symbols-per-second) or 5.360537 Msps after passing through forward error correction (FEC) and 64 or 256 QAM modulation.

As described above, the MAC layer and the PMD layer have different outputs and accordingly require different system clock rates. However, it is not easy to generate two system clock signals by using a shared clock signal unit. The MAC layer generates a sync message and transmits it to the PMD layer, but timing jitter of the sync message exists because of the different output rates of the MAC layer and the PMD layer. Therefore, in order to prevent this, accurate timing synchronization between the two layers is required. For this purpose, a very precise PLL device is needed, and the MAC layer's processing becomes very complicated.

The MAC layer generally processes data by the burst mode. That is, the MAC layer processes the data only when receiving broadband data from the backbone network. Further, the PMD layer processes the data by the continuous mode. Therefore, the PMD layer needs to insert a null packet into the output data of the MAC layer so as to maintain the output rate, which further hinders timing synchronization of the two layers.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a packet transmission method and device for preventing jitter from existing in the sync message.

An exemplary embodiment of the present invention provides a method for transmitting a packet of a first layer, including: receiving a plurality of packets from a second layer that is an upper layer of the first layer; detecting a packet including a sync message from the plurality of packets; collecting first time information for synchronization from the second layer; inserting the first time information into the sync message; and transmitting the plurality of packets at a predetermined data rate.

Another embodiment of the present invention provides a method for transmitting a packet of a first layer, including: transmitting a plurality of packets to a second layer that is a lower layer of the first layer: transmitting a packet including a sync message to the second layer; and transmitting first time information for synchronization to the second layer so that the second layer may insert second time information based on the first time information into a time information field of the sync message.

Yet another embodiment of the present invention provides a device for transmitting a packet of a first layer, including: a first layer processor for receiving a plurality of packets from a second layer that is an upper layer of the first layer; a time information receiver for periodically receiving first time information for synchronization from the second layer; and a synchronization processor for detecting a packet including a sync message from the plurality of packets, inserting the first time information into the sync message, and transmitting the plurality of packets at a predetermined data rate.

According to the exemplary embodiment of the present invention, a packet transmission method and device for generating no jitter in the sync message to be transmitted in a cable modem terminal system are provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Figure 1:
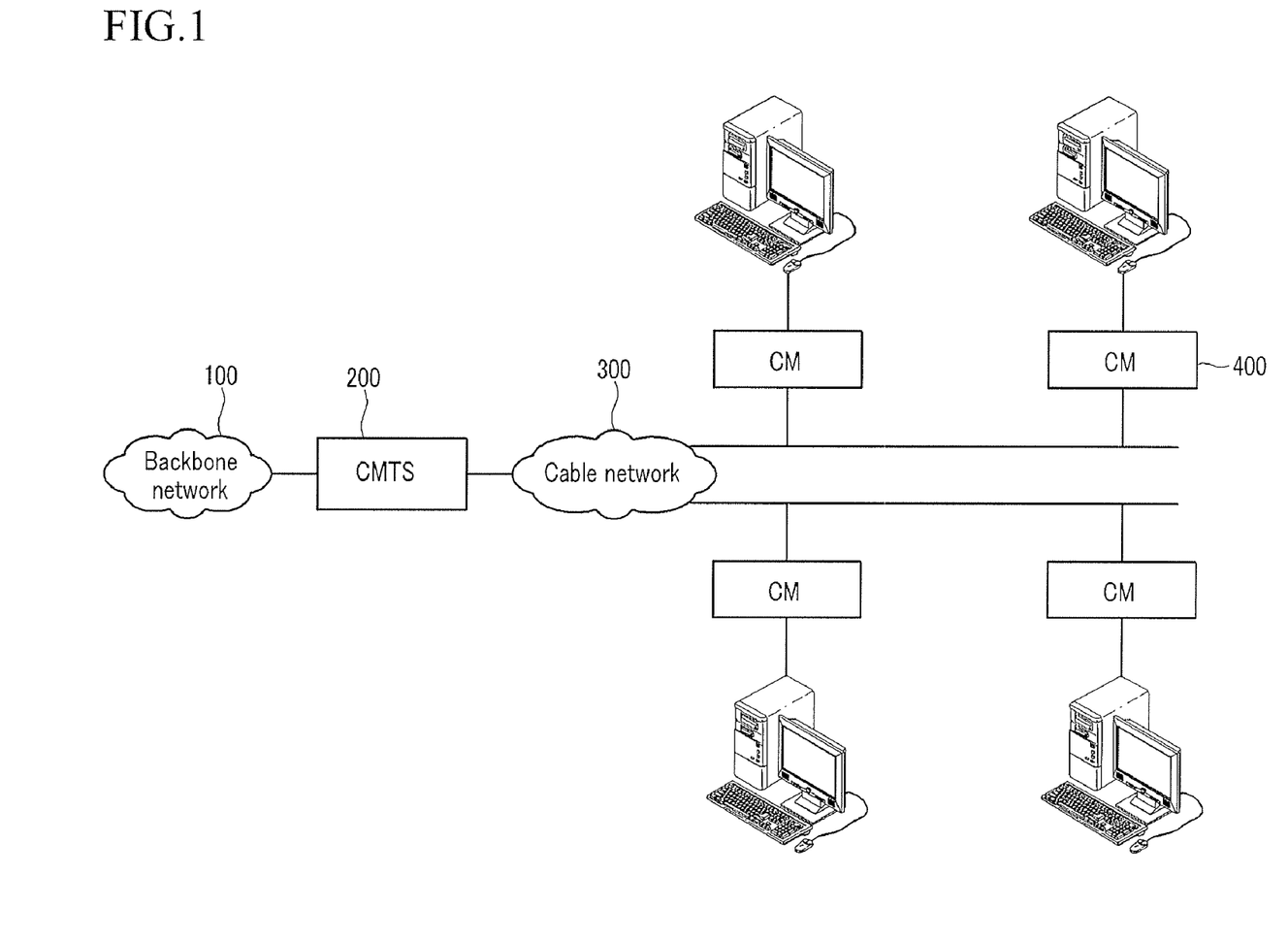
FIG. 1 shows a general network configuration of a cable communication system.

FIG. 1 shows a general network structure of a cable communication system (CMTS).

As shown in FIG. 1, a general network of a DOCSIS-based cable communication system includes a backbone network 100, a cable modem termination system (CMTS) 200, a cable network 300, and a plurality of cable modems (CMs) 400.

The backbone network 100 provides a service such as the Internet to a subscriber.

The CMTS 200 is located at a head-end and provides an uplink channel and a downlink channel. The CMTS 200 receives broadband data from the backbone network 100 to modulate them, and seamlessly transmits the modulated data to the downlink channel according to the broadcasting method at a constant data rate.

The cable network 300 is connected to a plurality of CMs 400, and a PC is respectively connected to the plurality of CMs 400.

The CMs 400 respectively filter and use the packet corresponding to the MAC layer of the CM from the broadband data that are transmitted to the downlink channel. The uplink channel shares the CMs 400 and transmits data to the CMTS 200 through the cable network 300 according to the point-to-point method. Therefore, timing synchronization between the CMTS 200 of the head-end and the CMs 400 is required.

For the purpose of timing synchronization between the CMTS 200 and the CMs 400, the CMTS 120 periodically transmits the sync message while maintaining accurate timing within an allowable timing error range. Also, the CMs 400 receive the sync message and corrects the error of the local clock signals to maintain accurate synchronization. Here, the timing error of the DOCSIS is given within 500 nano-seconds (ns).

The CMTS 200 transmits the sync message into which the 32 bit value generated by the master clock signals of 10.24 MHz is inserted as a time stamp value to thereby maintain the synchronization between the CMTS 200 and the CMs 400.

The CMs 400 receive the sync message to check the time stamp value and correct the counter value generated by the local clock signals of 10.24 MHz of the CMs to generate timing synchronization.

A structure of a CMTS 200 according to an exemplary embodiment of the present invention will now be described in detail with reference to FIG. 2.

Figure 2:
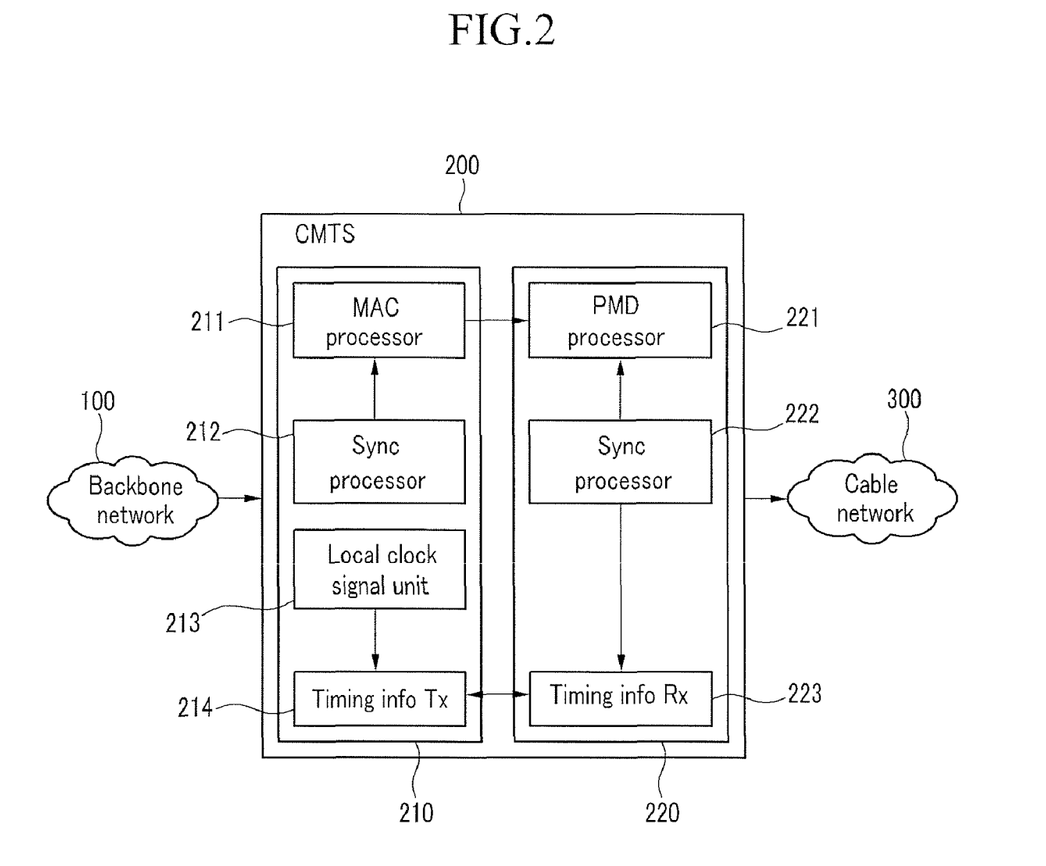
FIG. 2 shows a structure of a CMTS according to an exemplary embodiment of the present invention.

FIG. 2 shows a structure of a CMTS 200 according to an exemplary embodiment of the present invention.

As shown in FIG. 2, the CMTS 200 includes a MAC layer 210 and a PMD layer 220.

The CMTS 200 includes a data interface for transmitting MPEG-2 transport streams between the MAC layer 210 and the PMD layer 220, and a timing interface for sharing timing information of the same 10.24 MHz so that the MAC layer 210 and the PMD layer 220 may share the same timing information.

The MAC layer 210 includes a MAC processor 211, a synchronization processor 212, a local clock signal unit 213, and a timing information transmitter 214.

The MAC processor 211 receives broadband data from the backbone network 100 and processes them into the packets of the DOCSIS MAC frame. Also, the MAC processor 211 periodically inserts the sync message into the data and outputs resultant data.

The synchronization processor 212 fills the 32-bit field of the time stamp in the inserted sync message with 0's and transmits it.

The local clock signal unit 213 generates timing information of the 32-bit transport stream counter of 10.24 MHz.

The timing information transmitter 214 transmits timing information to the PMD layer 220 through the timing interface.

The PMD layer 220 includes a PMD processor 221, a synchronization processor 222, and a timing information receiver 223.

The PMD processor 221 modulates the packetized MAC frame transmitted by the MAC processor 211, and seamlessly transmits the modulated results to the cable network 130 through the downlink channel according to the broadcasting method.

The synchronization processor 222 detects the sync message and fills the time stamp field with the current time stamp value. The synchronization processor 222 prevents the timing jitter of the sync message by filling the final value of the time stamp in the sync message.

The timing information receiver 223 regenerates timing information of the 32-bit transport stream counter transmitted by the timing information transmitter 214 and uses the same in the case of inserting the time stamp.

A structure of a sync message when the sync message is inserted in the MAC layer 210 according to an exemplary embodiment of the present invention will now be described in detail with reference to FIG. 3.

Figure 3:
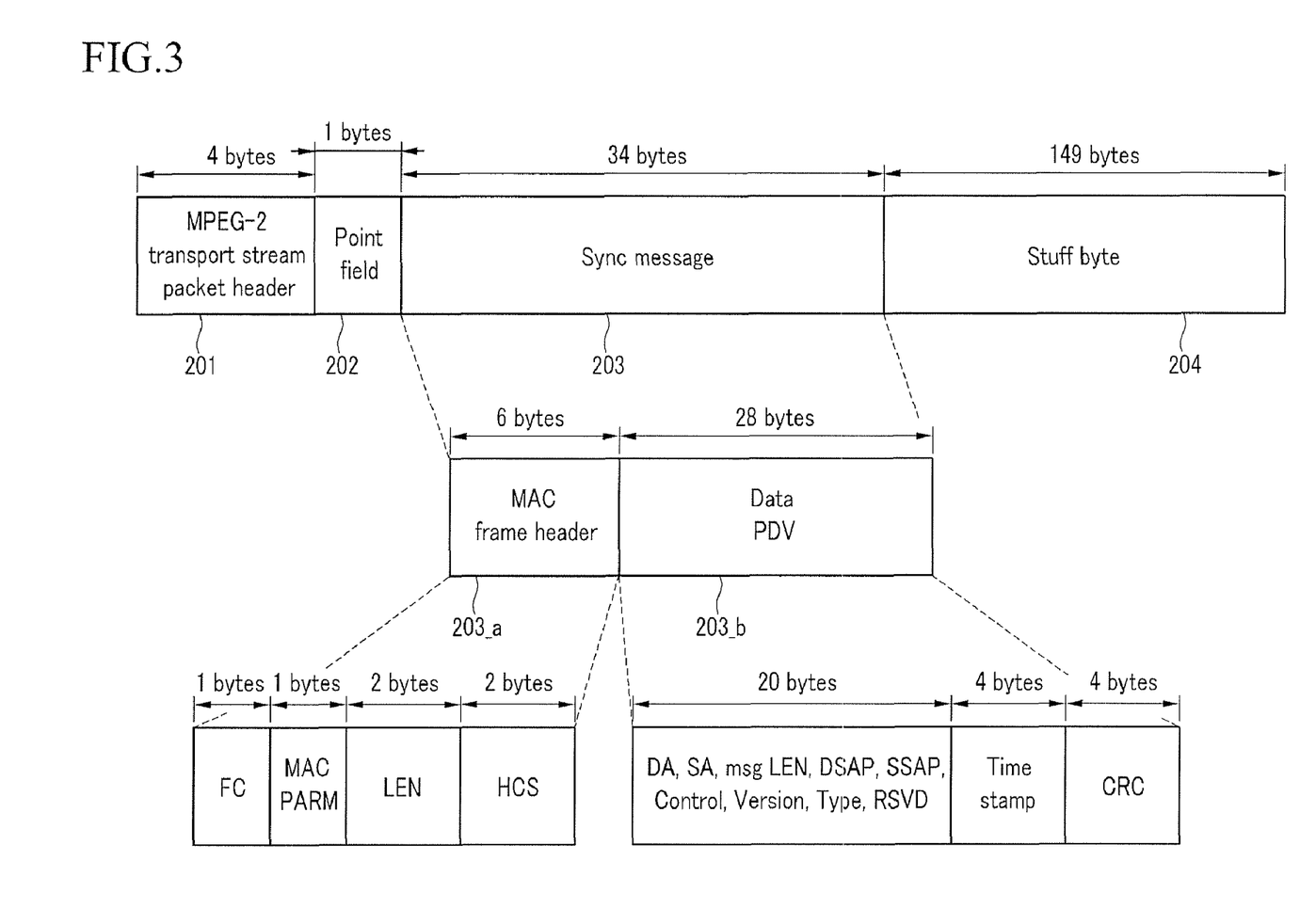
FIG. 3 shows a structure of a sync message when a sync message is inserted in the MAC layer according to an exemplary embodiment of the present invention.

FIG. 3 shows a configuration of a sync message 203 when the sync message 203 is inserted in the MAC layer 210 according to an exemplary embodiment of the present invention.

As shown in FIG. 3, the 188-byte MPEG-2 transport stream packet includes a 4-byte MPEG-2 transport stream packet header 201 and a 184-byte payload. The payload includes a 1-byte point field 202, a 34-byte sync message 203, and a 149-byte stuff byte 204. Here, the data format for the interface between the MAC layer 210 and the PMD layer 220 of the DOCSIS cable communication system is defined by the MPEG-2 transport stream packet.

The MPEG-2 transport stream packet header 201 has a configuration shown in Table 1.

TABLE 1

| Fields | Lengths (bits) | Setting values |
| --- | --- | --- |
| Sync_byte | 8 | 0x47 |
| Transport_error_indicator | 1 | '0' |
| Payload_unit_start_indicator (PUSI) | 1 | '1'or'0' |
| Transport_priority | 1 | '0' |
| PID | 13 | 0x1FFE |
| Transport_scrambling_control | 2 | '0' |
| Adaptation_field_control | 2 | '01' |
| Continuity_counter | 4 | |

The Transport_error$_{13}$ indicator field indicates an error existence state when receiving a packet, and it is set to be 1 when an error occurs during packet transmission. The Payload_unit_start_indicator (PUSI) field indicates an existence state of the point field 202.

Also, the Transport_priority field and the Transport_scrambling_control field are reserved bits and are set to be 0.

The payload transmits the sync message 203 of the MAC layer 210, and the first byte of the payload is set to be a point field 202 when the PUSI field is set to be 1. The value of the point field 202 designates the position of the byte at which a new sync message 203 starts in the current payload.

The sync message 203 includes a MAC frame header 203_a for defining contents of the sync message and a data protocol data unit (PDU) 203_b for setting a length and an existence state according to the MAC frame header 203_a.

The MAC frame header 203_a includes a 1-byte frame control (FC), a 1-byte MAC_PARA (parameter), a 2-byte LEN (length), an EHDR (extended MAC header) having a variable length from 0 to 255 bytes, and a 2-byte HCS (header check sequence).

The FC defines the type of the sync message 203, and it includes a 2-bit sync message control type field FC_TYPE, a 5-bit parameter field FC_PARA, and a 1-bit EHDR_ON field for indicating an existence state of the EHDR field. Here, the type of the sync message 203 transmitted to the downlink channel is classified as expressed in Table 2 according to the FC field.

TABLE 2

| | FC_TYPE | FC_PARM | EHDR_ON |
| --- | --- | --- | --- |
| User data frame | 00 | xxxxx | 0 or 1 |
| | 10 | xxxxx | 0 or 1 |
| MAC manage message frame | 11 | 00001 | 0 or 1 |
| Sync message frame | 11 | 00000 | 0 |

The MAC_PARM is a parameter field, and indicates the length of the EHDR field when the EHDR field is set to exist by setting the EHDR_ON to be 1.

The LEN indicates the length of the sync message 203, and the HCS detects a bit error in the sync message 203.

The data PDU 203_b includes a 4-byte time stamp set to be 0 and a 4-byte message cyclic redundancy check (CRC) field.

The stuff byte 204 includes 149 bytes so that the MPEG-2 packet at which the sync message 203 is positioned may include no other sync message.

A timing interface between the information transmitter 214 of the MAC layer 210 and the information receiver 223 of the PMD layer 220 according to an exemplary embodiment of the present invention will now be described in detail with reference to FIG. 4.

Figure 4:
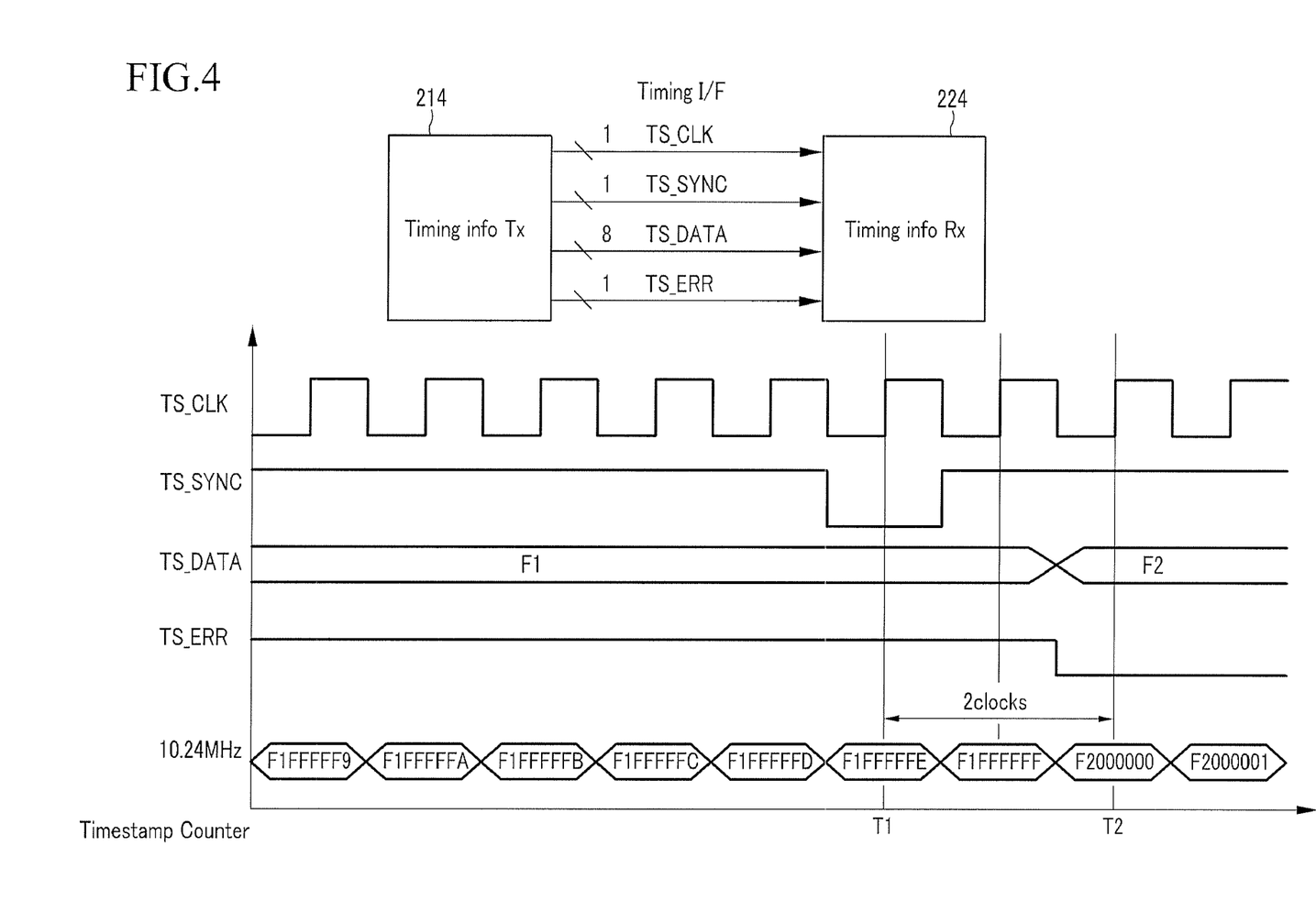
FIG. 4 shows a timing interface between an information transmitter of a MAC layer and an information receiver of a PMD layer according to an exemplary embodiment of the present invention.

FIG. 4 shows a timing interface between the information transmitter 214 of the MAC layer 210 and the information receiver 223 of the PMD layer 220 according to an exemplary embodiment of the present invention.

The timing interface interfaces the MAC layer 210 and the PMD layer 220 so that they may share the same counter value through the information transmitter 214 and the information receiver 223 by using minimum signals including a 1-bit time stamp clock (TS_CLK) signal, a 1-bit time stamp sync (TS_SYNC) signal, an 8-bit time stamp data (TS_DATA) signal, and a 1-bit time stamp error (TS_ERR) signal.

The time stamp clock (TS_CLK) signal is the 10.24 MHz clock signal, and the MAC layer 210 generates a 32-bit time stamp counter that increases by 1 for each clock signal. Here, the upper 8 bits from the 32-bit counter are used as a time stamp data (TS_DATA) signal.

The time stamp sync (TS_SYNC) signal generates 0 at the time T1 that is in advance by two clock signals to the time T2 when the lower 24 bits have 0 from among the 32-bit time stamp counter.

The MAC layer 210 generates a time stamp clock (TS_CLK) signal, a time stamp data (TS_DATA) signal, and a time stamp sync (TS_SYNC) signal and transmits them to the PMD layer 220. The PMD layer 220 resets the 32-bit time stamp counter value. In detail, when the received stamp sync (TS_SYNC) signal becomes 0, the PMD layer 220 sets the upper 8-bit time stamp counter value from among the 32-bit time stamp counter to be a time stamp data (TS_DATA) signal. Also, the PMD layer 220 adds 1 to the upper 8-bit counter value after two clock signals and sets the remaining lower 24 bits to be 0 to reset the 32-bit time stamp counter value.

The reset PMD layer 220 drives the counter that increases by 1 according to the time stamp clock (TS$_{13}$ CLK) signal. The time stamp counter generated by the PMD layer 220 accurately corresponds to the time stamp counter generated by the MAC layer 210.

The time stamp error (TS_ERR) signal periodically checks the time stamp data (TS_DATA) signal and the time stamp sync (TS_SYNC) signal so as to determine whether the time stamp counter generated by the PMD layer 220 accurately corresponds to the time stamp counter generated by the MAC layer 210. The time stamp error (TS_ERR) signal transmits 0 to the MAC layer 210 when the time stamp counter generated by the PMD layer 220 does not correspond to the time stamp counter generated by the MAC layer 210.

A method for inserting a time stamp into a sync message in the PMD layer 220 according to an exemplary embodiment of the present invention will now be described with reference to FIG. 5.

Figure 5:
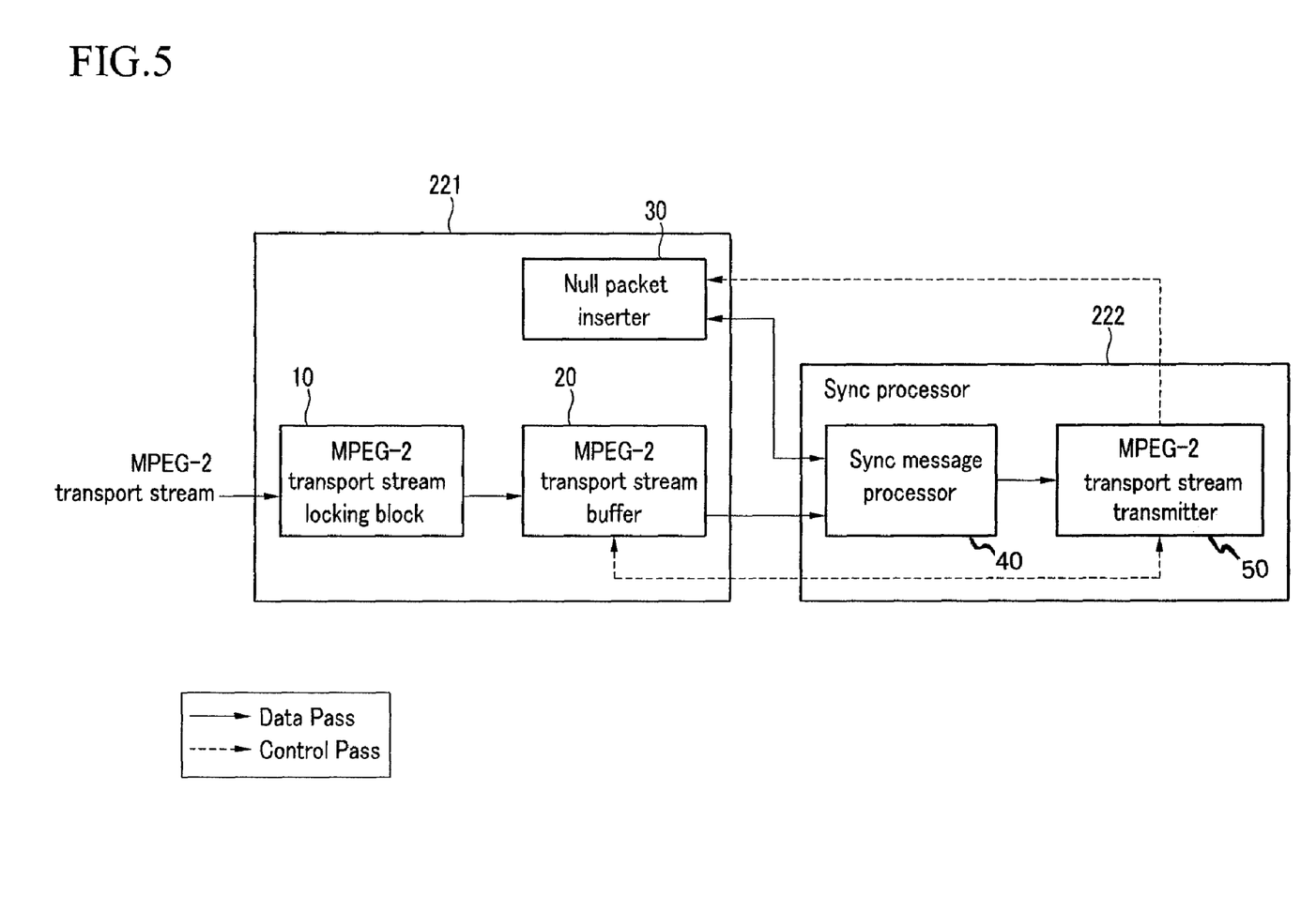
FIG. 5 shows a PMD processor and a synchronization processor of a PMD layer according to an exemplary embodiment of the present invention.

FIG. 5 shows a PMD processor 221 and a synchronization processor 222 of a PMD layer 220 according to an exemplary embodiment of the present invention.

As shown in FIG. 5, the PMD processor 221 includes an MPEG-2 transport stream locking block 10, an MPEG-2 transport stream buffer 20, and a null packet inserter 30. Also, the synchronization processor 222 includes a sync message processor 40 and an MPEG-2 transport stream transmitter 50.

The MPEG-2 transport stream locking block 10 receives an MPEG-2 transport stream from the MAC layer 210, and locks the 188-byte MPEG-2 transport stream packet.

The MPEG-2 transport stream buffer 20 stores data per MPEG-2 transport stream packet. In this instance, the PMD layer 220 outputs and processes the MPEG-2 transport stream packet data stored in the MPEG-2 transport stream buffer 20 according to a predetermined data rate. Here, when the data rate for storing data in the MPEG-2 transport stream buffer 20 is greater than the predetermined data rate, a buffer overflow occurs to generate an error.

The null packet inserter 30 generates a random null packet and consecutively operates the PMD layer 220 when the data rate for storing data in the MPEG-2 transport stream buffer 20 is less than the predetermined data rate. The PMD layer 220 does not use the functions of the null packet inserter 30 and the sync message processor 40 when receiving the accurate predetermined data rate from the MAC layer 210. However, since the MAC layer 210 and the PMD layer 220 do not use the common clock signals, the data rate develops an error.

The null packet inserter 30 generates and inserts a null packet into the MPEG-2 transport stream packet and transmits it to the sync message processor 40. Here, the sync message processor 40 processes the sync message after the null packet inserter 30 inserts the null packet into the MPEG-2 transport stream packet so that no jitter may be generated in the time stamp value to be inserted into the sync message.

The sync message processor 40 detects the sync message in the MPEG-2 transport stream packet, generates a time stamp value of the sync message by using the 32-bit time stamp counter generated by the PMD layer 220, and inserts the time stamp value into the sync message.

The MPEG-2 transport stream transmitter 50 transmits the null packet and the MPEG-2 transport stream packet to the cable network 300 at a constant data rate.

The sync message processor 40 of the PMD layer 220 according to an exemplary embodiment of the present invention will now be described with reference to FIG. 6 to FIG. 9.

Figure 6:
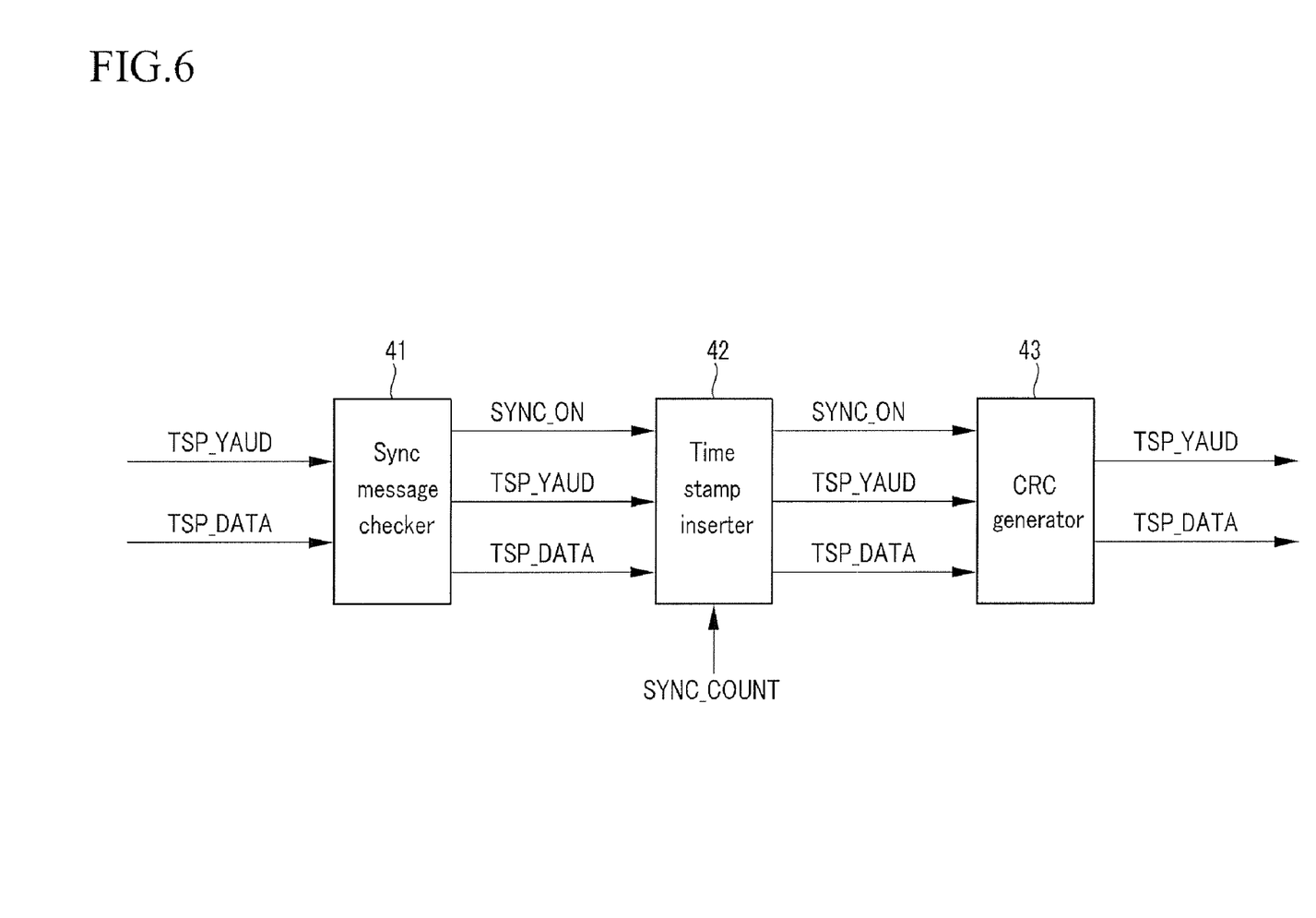
FIG. 6 shows a sync message processor of a PMD layer according to an exemplary embodiment of the present invention.

FIG. 6 shows the sync message processor 40 of the PMD layer 220 according to an exemplary embodiment of the present invention.

As shown in FIG. 6, the sync message processor 40 includes a sync message checker 41, a time stamp inserter 42, and a CRC generator 43. The time used by the respective blocks are set by one clock signal, and the process by the sync message 203 is performed with a delay of a total of 3 clock signals.

The sync message checker 41 determines whether the MPEG-2 transport stream packet has a sync message. In detail, the sync message checker 41 checks whether a PUSI field of the MPEG-2 transport stream packet header (201 of FIG. 3) is "1", a point field (202 of FIG. 3) is "0×00", and an FC field value of the MAC frame header (203_a of FIG. 3) is "0×C0" to detect the MPEG-2 transport stream packet including a sync message.

An operation for a sync message checker 41 according to an exemplary embodiment of the present invention to read a transport stream packet from an MPEG-2 transport stream buffer 20 and check whether the transport stream packet includes a sync message, and corresponding input/output signals, will now be described with reference to FIG. 7.

Figure 7:
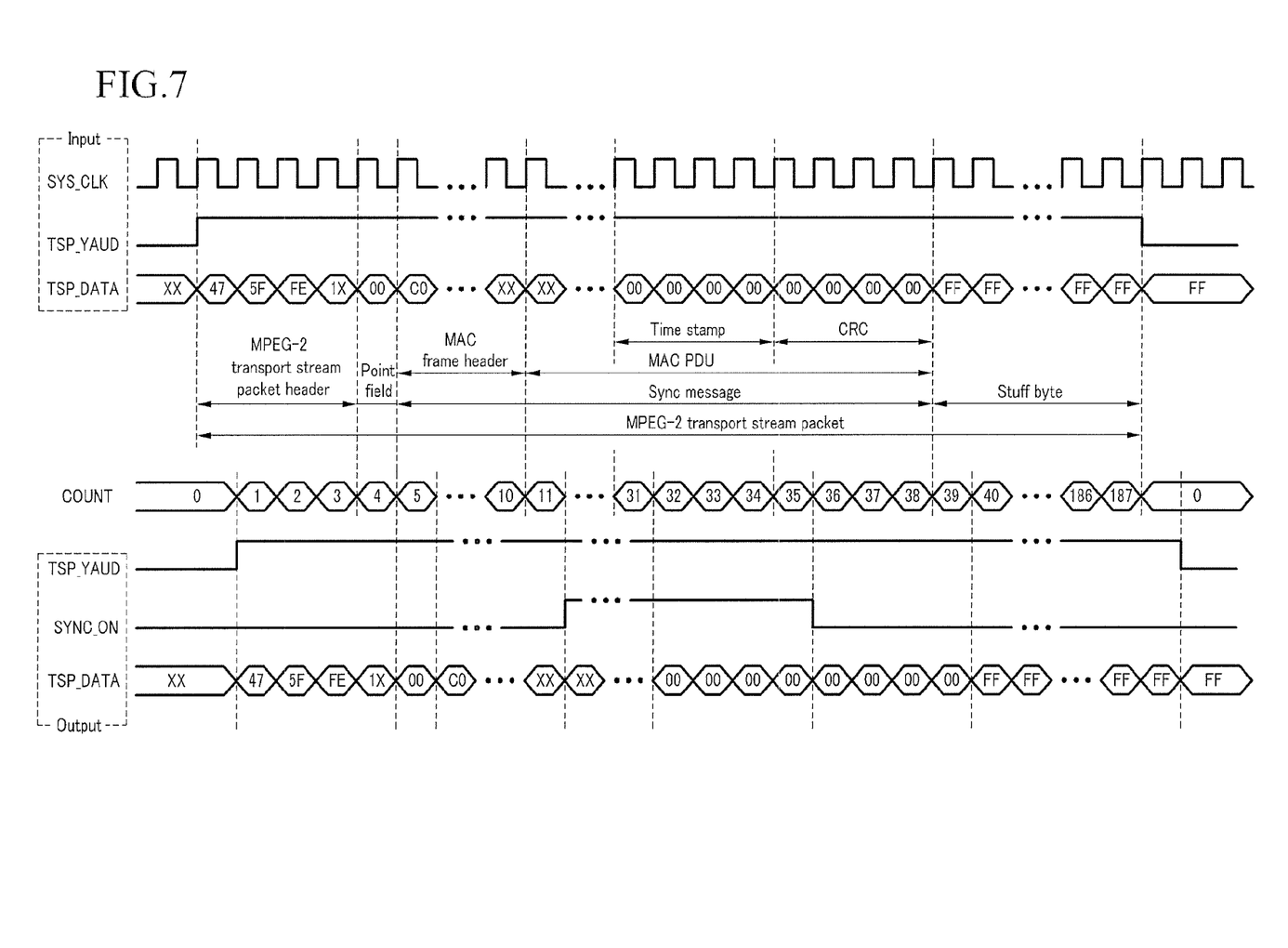
FIG. 7 shows an operation and input/output signals of a sync message checker according to an exemplary embodiment of the present invention.

FIG. 7 shows an operation and input/output signals of the sync message checker 41 according to an exemplary embodiment of the present invention.

As shown in FIG. 7, when a transport stream packet is read from the MPEG-2 transport stream buffer (20 of FIG. 5) and is found to include a sync message, the sync (SYNC_ON) signal outputs 1 when sync message data are output.

A process for inserting a time stamp counter (50 of FIG. 5) into a time stamp field of a sync message when a sync (SYNC_ON) signal according to an exemplary embodiment of the present invention outputs 1 will now be described with reference to FIG. 8.

Figure 8:
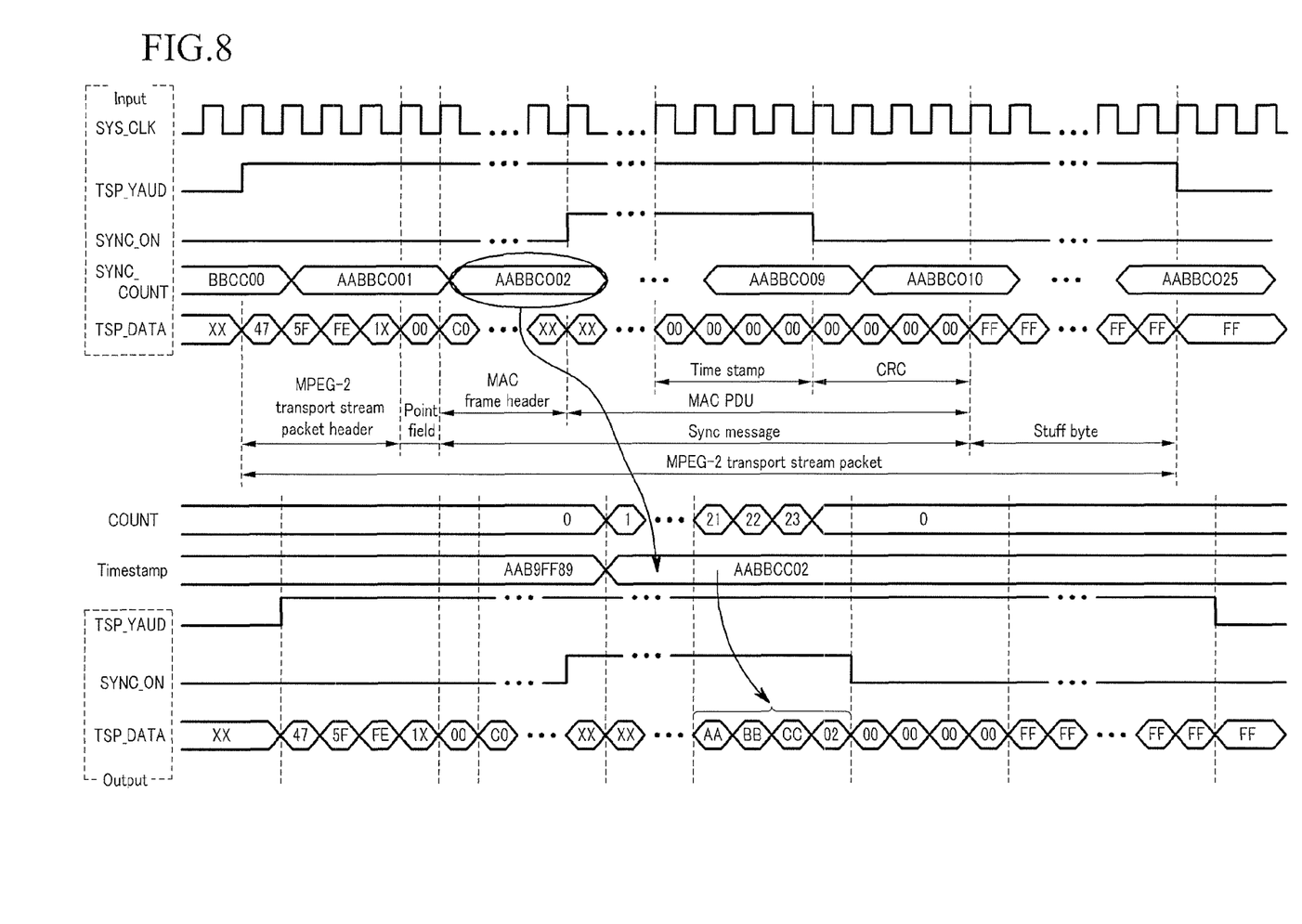
FIG. 8 shows an operation and input/output signals of a time stamp inserter according to an exemplary embodiment of the present invention.

FIG. 8 shows an operation and input/output signals of a time stamp inserter 42 according to an exemplary embodiment of the present invention.

As shown in FIG. 8, the time stamp inserter 42 reads the time stamp value, inserts the same into the time stamp field of the sync message, and outputs a result. In this instance, the time for reading the time stamp value and the time for inputting/outputting the signal correspond with each other.

As the time stamp field value is changed, the time stamp inserter 42 calculates the changed time stamp field value and the CRC field value and inserts the result into the CRC field. Here, the CRC is found from Equation 1.

$$\chi^{32}+\chi^{26}+\chi^{23}+\chi^{22}+\chi^{16}+\chi^{12}+\chi^{11}+\chi^{10}+\chi^{8}\chi^{7}+\chi^{5}+\chi^{4}+\chi^{2}+\chi+1 \quad \text{(Equation 1)}$$

Equation 1 generally requires a bit-wise operation, but it is calculated through the byte-wise operation having the same result for ease of operation and fast processing.

Figure 9:
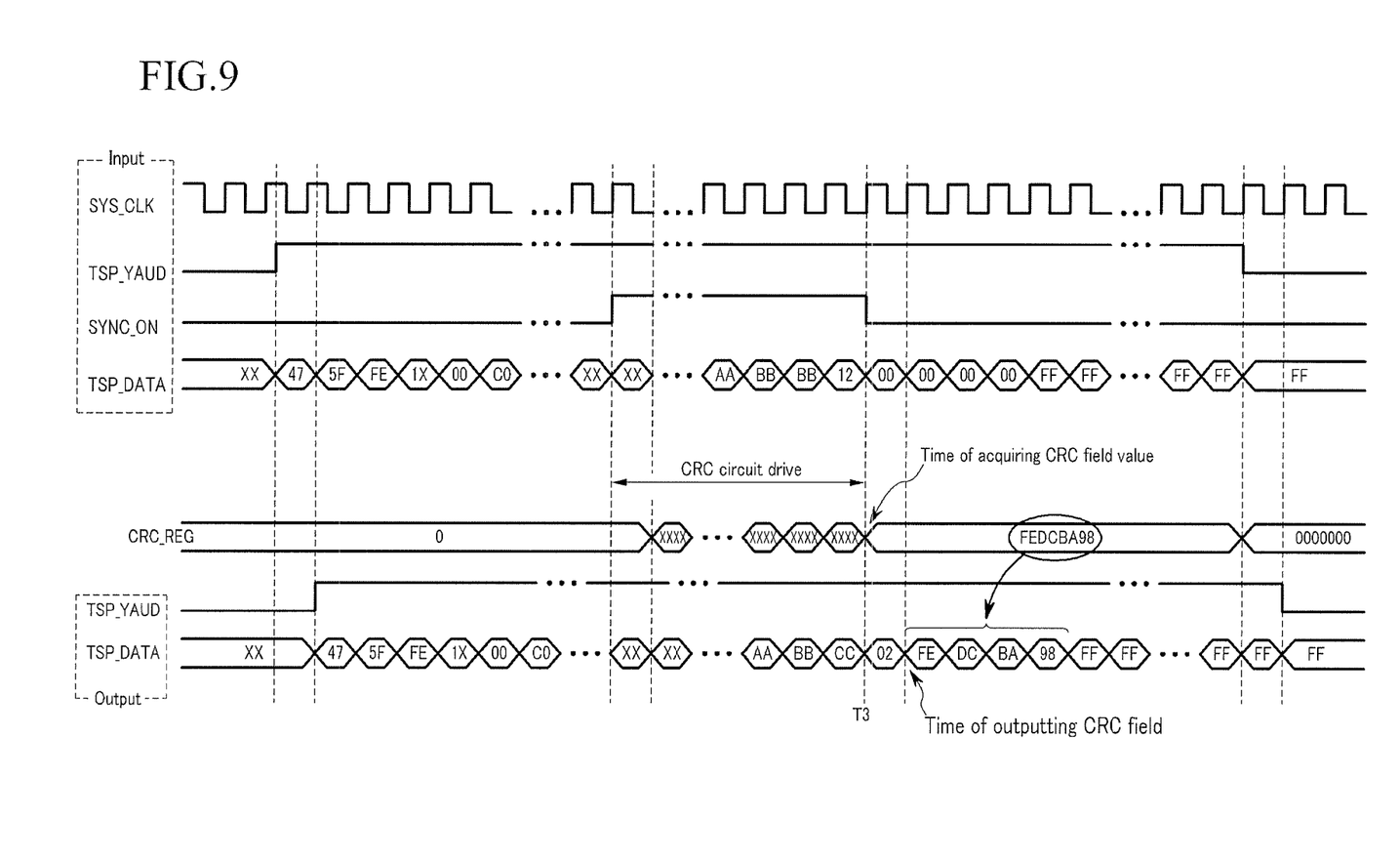
FIG. 9 shows an operation and input/output signals of a CRC generator according to an exemplary embodiment of the present invention.

FIG. 9 shows an operation and input/output signals of a CRC generator 43 according to an exemplary embodiment of the present invention.

As shown in FIG. 9, the CRC generator 43 drives the CRC circuit when the sync (SYNC_ON) signal is 1. The CRC generator 43 reads the 32-bit value stored in a register of the CRC circuit per a unit of 8 bits starting from the time T3 when the sync (SYNC_ON) signal is 0, and then uses it as a CRC field value.

A packet transmission method for preventing generation of jitter in a sync message when transmitting the sync message between the MAC layer 210 and the PMD layer 220 will now be described with reference to FIG. 10.

Figure 10:
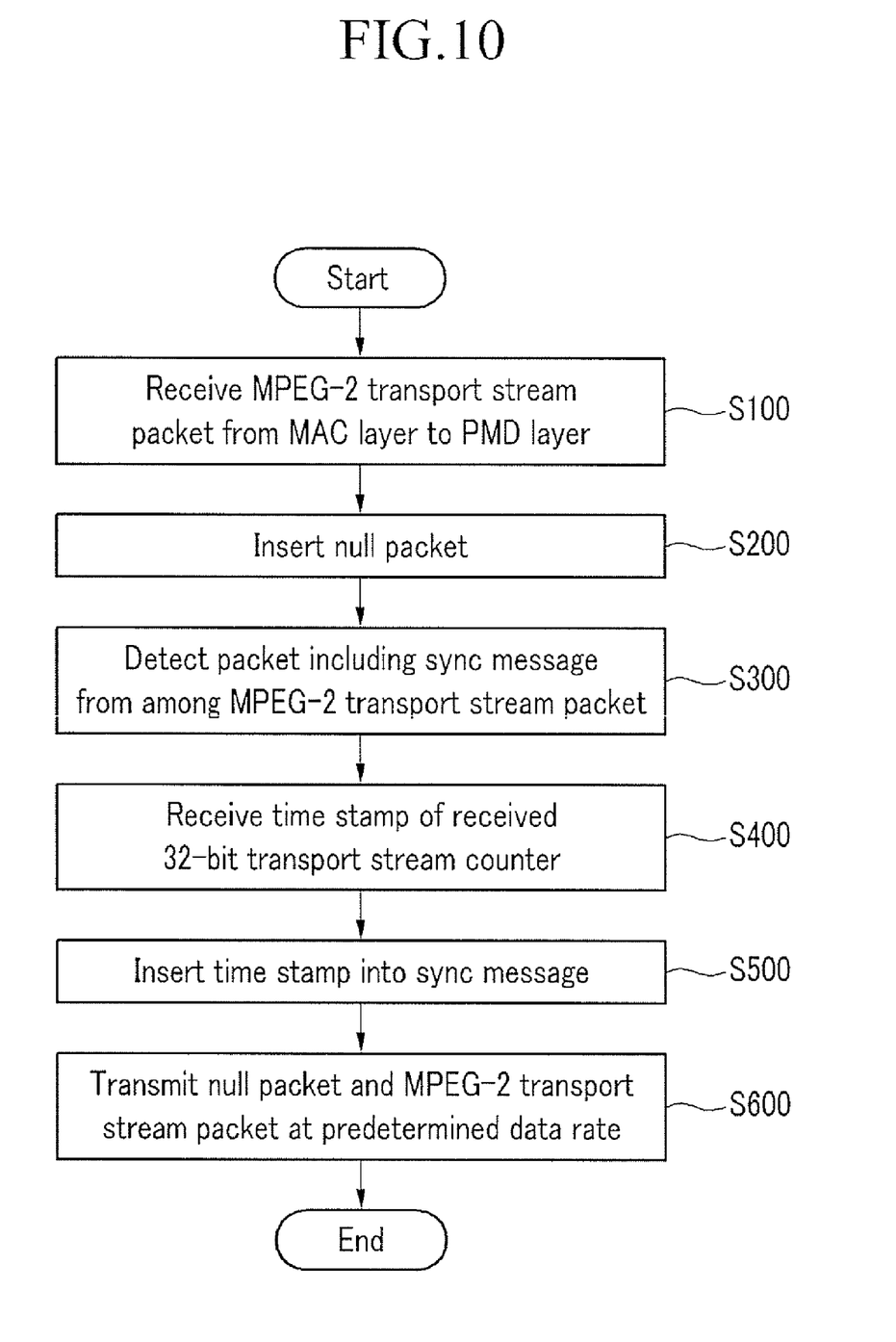
FIG. 10 shows a flowchart of a packet transmission method according to an exemplary embodiment of the present invention.

FIG. 10 shows a flowchart for a packet transmission method according to an exemplary embodiment of the present invention.

As shown in FIG. 10, the PMD processor 221 receives a packetized MPEG-2 transport stream packet from the MAC processor 211 (S100). The null packet inserter 30 generates a random null packet and transmits it to the sync message processor 40 (S200).

The sync message processor 40 detects the sync message in the MPEG-2 transport stream packet S300.

The timing information receiver 223 regenerates timing information of the packetized MPEG-2 transport stream time stamp counter from the MAC processor 211 (S400).

After S200, the sync message processor 40 inserts the time stamp generated in the step of S400 into the sync message detected in the step S300 (S500).

The PMD processor 221 modulates the sync message into which the time stamp is inserted in the step S500 and transmits a result to the cable network 300 at a constant data rate.

When the sync message is transmitted between the MAC layer 210 and the PMD layer 220 as described, the MAC layer 210 generates a sync message and transmits the same to the PMD layer 220 and the PMD layer 220 inserts a time stamp into the sync message without accurate synchronization between the two layers to thus prevent generation of jitter.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a packet of a first layer, comprising:
    transmitting a plurality of packets to a second layer that is a lower layer of the first layer:
    transmitting a packet including a sync message to the second layer; and
    transmitting first time information for synchronization to the second layer so that the second layer inserts second time information based on the first time information into a time information field of the sync message,
    wherein the second time information is time information after the second layer inserts a null packet,
    wherein transmitting of a packet including sync message includes periodically transmitting a packet including the sync message,
    wherein the periodically transmitting of a packet including a sync message includes transmitting a packet including a sync message having the time information field of 0.

2. The method of claim 1, wherein the second layer is a physical media dependent (PMD) layer.

3. The method of claim 2, wherein the first layer is a media access control (MAC) layer.

4. The method of claim 3, wherein the packet comprises a MPEG-2 transport stream packet.

5. The method of claim 1, wherein the first layer is a media access control layer, and the second layer is a physical layer.

6. A device for transmitting a packet of a first layer comprising:
    a first layer processor for receiving a plurality of packets from a second layer that is an upper layer of the first layer;
    a time information receiver for periodically receiving first time information for synchronization from the second layer; and
    a synchronization processor for detecting a packet including a sync message from the plurality of packets, inserting the first time information into the sync message, and transmitting the plurality of packets at a predetermined data rate the synchronization processor comprising a sync message processor which includes:
    a time information inserter for inserting second time information that is a time after insertion of a null packet into the sync message according to the first time information; and
    a message cyclic redundancy checker for changing message cyclic redundancy check information of the sync message when the second time information is inserted into the sync message.

7. The device of claim 6, wherein
the first layer processor includes a null packet inserter for inserting a plurality of null packets so as to maintain the predetermined data rate, inserting the first time information into the sync message, and transmitting the plurality of packets together with the null packet when transmitting the plurality of packets.

8. The device of claim 6, wherein the second layer is a media access control (MAC) layer.

9. The device of claim 6 wherein the first layer is a physical media dependent (PMD) layer.

* * * * *